United States Patent
Schuelin et al.

(10) Patent No.: US 12,273,007 B2
(45) Date of Patent: Apr. 8, 2025

(54) COOLING OF AN ELECTRIC DRIVE IN AN ELECTRICALLY DRIVEN VEHICLE

(71) Applicant: Robert Bosch GmbH, Stuttgart (DE)

(72) Inventors: Anton Schuelin, Leipzig (DE); Julius Georgemannan, Trichy Tamil Nadu (IN); Marie-Luies Schoeneck, Grossbottwar (DE); Martin Kuehnemund, Stuttgart (DE); Peter Zweigle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 445 days.

(21) Appl. No.: 17/796,244

(22) PCT Filed: Dec. 23, 2020

(86) PCT No.: PCT/EP2020/087741
§ 371 (c)(1),
(2) Date: Jul. 28, 2022

(87) PCT Pub. No.: WO2021/151599
PCT Pub. Date: Aug. 5, 2021

(65) Prior Publication Data
US 2023/0106304 A1    Apr. 6, 2023

(30) Foreign Application Priority Data
Jan. 30, 2020   (DE) ............... 10 2020 201 127.3

(51) Int. Cl.
*H02K 5/20*   (2006.01)
*H02K 9/19*   (2006.01)

(52) U.S. Cl.
CPC ............... *H02K 5/203* (2021.01); *H02K 9/19* (2013.01)

(58) Field of Classification Search
CPC .......... H02K 5/203; H02K 9/19; H02K 9/197; H02K 1/276; H02K 5/20
USPC ............................................. 310/54
See application file for complete search history.

(56) References Cited

U.S. PATENT DOCUMENTS

| | | | |
|---|---|---|---|
| 2007/0210655 A1* | 9/2007 | Bahr | H02K 5/203 310/89 |
| 2013/0328423 A1* | 12/2013 | Ikeda | H02K 5/203 310/54 |
| 2014/0069099 A1* | 3/2014 | Rohwer | B60L 3/0061 903/902 |

(Continued)

FOREIGN PATENT DOCUMENTS

| DE | 102007055910 A1 | 4/2009 |
|---|---|---|
| DE | 102009001387 A1 | 9/2010 |
| DE | 102010029986 A1 | 12/2011 |

(Continued)

OTHER PUBLICATIONS

Translation of International Search Report for Application No. PCT/EP2020/087741 dated Apr. 13, 2021 (2 pages).

*Primary Examiner* — Ahmed Elnakib
(74) *Attorney, Agent, or Firm* — Michael Best & Friedrich LLP

(57) ABSTRACT

The invention relates to an electric drive (10) of an electrically driven vehicle. The electric drive (10) comprises a rotor (22) and a stator (24) which is enclosed by a housing (25). The housing (25) is formed by an outer part (48) and an inner part (50), each of which has an axial ribbing (62, 64) extending in an axial direction (78) of the housing (25).

12 Claims, 7 Drawing Sheets

(56) References Cited

U.S. PATENT DOCUMENTS

2019/0226486 A1* 7/2019 Iizuka .................... F02B 39/00

FOREIGN PATENT DOCUMENTS

| | | | |
|---|---|---|---|
| DE | 102012008209 A1 | | 10/2013 |
| DE | 102018200365 A1 | | 1/2019 |
| DE | 102018217638 A1 | | 6/2019 |
| DE | 102018212120 A1 | | 1/2020 |
| EP | 0049735 | * | 4/1982 |
| WO | 2018216304 A1 | | 11/2018 |
| WO | 2019159522 A1 | | 8/2019 |
| WO | WO 2019/159522 | * | 8/2019 |
| WO | WO-2021043506 A1 | * | 3/2021 ............... H02K 5/20 |

* cited by examiner

COOLING OF AN ELECTRIC DRIVE IN AN ELECTRICALLY DRIVEN VEHICLE

BACKGROUND OF THE INVENTION

The invention relates to an electric drive of an electrically driven vehicle comprising a rotor and a stator which is enclosed by a housing. The invention additionally relates to the use of the electric drive in an e-axle module of an electrically driven vehicle.

DE 10 2018 200 365 A1 discloses a cooling unit for cooling an electric machine. The cooling unit has a hollow-cylindrical cooling jacket and a cooling channel formed on the cooling jacket. The cooling channel is provided on a radially outer surface of the cooling jacket in relation to a central axis of the cooling unit.

DE 10 2012 008 209 A1 relates to an electric machine with a housing and a casing enclosing the housing concentrically. An annular cooling jacket, which is closed off in liquid-tight fashion and through which a coolant can flow, extends between the housing and the casing. The cooling jacket has a plurality of coolant channels arranged side by side in the axial direction and extending in the circumferential direction of the housing, said coolant channels extending between ribs which are arranged on the outer circumference of the housing.

DE 10 2010 029 986 A1 relates to an electric machine having a housing, in which there are arranged a stator and a rotor. The housing has an outer casing and an inner casing, which is distanced in some portions from the stator and points towards the stator. A cooling jacket is provided between the outer casing and the inner casing. The cooling jacket comprises a plurality of channels running around a rotation axis of the electric machine in order to guide the cooling medium through.

In electric machines that are used in electric drive axles of electric vehicles, the stator of said electric machines is usually cooled with liquid. For this purpose, the stator is installed in an aluminum housing produced by an extrusion process. The housing is generally double-walled and between the two walls has webs which extend in the longitudinal direction of the housing. Cooling water channels running parallel to one another are created by the separating webs. Deflection pockets are located in each of the two endshields of the electric machine and deflect the liquid exiting from a longitudinal channel through 180° and divert it into the adjacent channel. A flow of liquid thus passes in meandering fashion around the entire circumference of the housing casing of the electric machine and thus cools the latter.

It is also known that a cooling water guide is formed economically by extending a front endshield and by extending a rear endshield. An outer wall and an inner wall of the cooling housing can thus be formed. The housing itself is thus reduced in this way. With this option a first endshield is formed as a pressure die-cast part, whereas a second endshield is generally formed as an extruded part.

SUMMARY OF THE INVENTION

In accordance with the invention an electric drive of an electrically driven vehicle is proposed, wherein the electric drive comprises an electric machine with a rotor and a stator and the rotor is enclosed by a housing. The housing comprises an outer part and an inner part which each have an axial ribbing extending in an axial direction of the housing.

By dividing the housing of the electric machine into an inner part and an outer part, on the one hand the deflection pockets previously necessary can be spared from a manufacturing point of view. Furthermore, by way of the solution proposed in accordance with the invention, an overflow of cooling fluid from one cooling channel into a cooling channel adjacent thereto can be avoided, so that, considered overall, the cooling power available to dissipate heat of an electric machine can be kept substantially constant.

In a development of the solution proposed in accordance with the invention, the electric drive is configured such that the axial ribbings, in the joined state of the outer part or the inner part of the housing, form an intermediate space through which the cooling medium flows exclusively in a tangential direction. The meandering component of the cooling medium flow provided in previous solutions can be significantly reduced by the solution proposed in accordance with the invention and ideally can be completely avoided, so that an exclusively tangential flow of the cooling medium is established.

In a further advantageous embodiment of the solution proposed in accordance with the invention, an inflow and an outflow for the cooling medium are located on the outer part and are arranged at an axial distance in relation to one another. Due to the distance between inflow and outflow achievable by the axial spacing, the flow of cooling medium can be prevented from following shorter, bypassing routes, so that, rather, a flow through the various cooling channels extending in the axial direction is produced, which is accompanied by a constant removal of heat.

In an advantageous development of the solution proposed in accordance with the invention, the inflow and the outflow are arranged on the outer part of the housing advantageously offset for example by 180° relative to one another. As a result, the inflow and outflow for the cooling medium can thus be arranged opposite one another, and a flow path running exclusively in the tangential direction is impressed on the cooling medium, assisted by the force of gravity. Offset angles different from 180° are also possible.

In an advantageous variant of the solution proposed in accordance with the invention, the inflow for the cooling medium lies in a first axial plane, whereas the outflow of the cooling medium lies preferably in a second axial plane, distanced therefrom, as seen in the axial direction; the inflow and the outflow can also be arranged in the same axial plane.

By way of such an arrangement of inflow and outflow of the cooling medium, it is possible to achieve an optimization of the flow path of the cooling medium, which runs only tangentially, so that a maximum amount of lost heat can be discharged from the electric machine.

The electric drive proposed in accordance with the invention also comprises axial ribbings, which are provided on demolding bevels of the outer part and inner part of the housing. The formation of demolding bevels on the outer part and inner part of the housing, which in the joined state form the coolant channels and extend in the axial direction, allows the manufacture of a housing of the electric machine, comprising an inner part and outer part, by pressure die-casting methods.

In the solution proposed in accordance with the invention the outer part and inner part of the housing can advantageously be embodied in each case in a conicity, which likewise contributes to an easier demolding of the outer part and inner part of the housing, provided these are manufactured by means of pressure die-casting methods.

In the solution proposed in accordance with the invention, the axial ribbing is provided in an inner circumferential surface of the outer part within a machined region, wherein the axial ribbing of the outer part on the inner circumferential surface of the outer part comprises in particular a cylindrical overturn. By contrast, the axial ribbing is created on an outer circumferential surface of the inner part of the housing within a machined region in such a way that in particular a conical overturn is formed there. Due to the subsequent, in particular material-removing machining of the inner part and outer part in the region of the axial ribbing within the demolding bevels, the cooling channels extending substantially in the axial direction can be kept particularly flat in respect of their geometry, which implies an optimal dissipation of lost heat from the electric machine on the one hand and a particularly space-saving design for coolant channels on the other hand.

In the solution proposed in accordance with the invention the electric drive is created in such a way that the conicity is determined by a first diameter and a second diameter, for example of the inner part of the housing. The corresponding conicity of the outer part of the housing is created in a manner complementary thereto.

The electric drive is advantageously created such that the stator of the electric machine is fixed by way of a shrink connection in the inner part of the housing, in particular is shrunk into the latter. This allows a particularly simple mounting of the stator of the electric machine in the inner part of the housing, without the need for any fastening elements or the like.

In an advantageous variant of the electric drive proposed in accordance with the invention, the axial ribbing of the inner part of the housing is provided with interruptions. A turbulent flow state is thus impressed on a flow of the cooling medium, as a result of which a significant improvement in the heat dissipation from the electric machine can be achieved.

In addition, the invention relates to the use of the electric drive in an e-axle module of a drivetrain of an electrically driven vehicle.

Due to the rib-shaped design both of the outer part and of the inner part of the housing of the electric machine, a very large surface is advantageously achieved, which leads to an optimal heat transfer to the cooling medium, for example cooling water. Furthermore, it must be emphasized that it has proven very advantageous that the flow assumes a turbulent state as a result of the flow around the axial ribbings, which are provided on the outer part and on the inner part as seen in the axial direction of the housing, which is accompanied by a significant improvement in the attainable heat transfer. Since the cooling channels in the solution proposed in accordance with the invention are not provided as a cavity in a part, for example in a casting core, they can be made very flat by the dimensional coordination of the outer part and inner part. Due to cooling channels that are formed flat, the greatest possible amount of the flowing medium is in contact with the surface where the heat dissipation is to occur, so that the heat can be absorbed optimally by the cooling medium or rather transferred thereto. Due to the very flat design of the channels provided for the flow of the cooling medium in the form of intermediate spaces or flat gaps between the axial ribbings on the inner part and outer part of the housing, a very high flow rate of the cooling medium can be realized.

In the solution proposed in accordance with the invention the design of the cooling is such that, in the event of a smallest cross-section resulting from a tolerance, the admissible flow resistance on the one hand is not exceeded and on the other hand, with a largest cross-section, sufficient cooling power is ensured.

In the solution proposed in accordance with the invention, the cooling water guidance is optimized in that the cooling water flows in at the inflow and exits again from the cooling channel geometry at an outlet port arranged opposite the inflow, offset by 180°. In this way, the cooling water is conducted equally around both sides of the electric machine tangentially. The axial ribbings interlocking with one another on the inner part and outer part of the housing ensure the necessary influencing of the cooling medium flow and the optimization of the attainable cooling effect. Since the inflow and outflow of the cooling medium in the axial direction lie as far from one another as possible, a flow around substantially the entire two-part housing, comprising the inner part and outer part, is achieved. In principle, however, the two ports, i.e. the inflow and the outflow, for the cooling medium could also be arranged in one and the same axial plane.

The outer part of the housing can be manufactured for example as a cast part and can be provided with demolding bevels. The inner part of the housing is cylindrical as a result of the production process. So as not to let the channel cross-section, i.e. the intermediate space in which the cooling medium flows, become too large, the raised protruding parts of the axial ribbings in the inner part and outer part are machined with material removal fully or partially, so that, for example in respect of the axial ribbings, a machining thereof can be performed to the extent that they are either conically overturned or cylindrically overturned. In both cases, the presence of the demolding bevels on the inner part and outer part can be used advantageously to optimize the geometry of the cooling channels, i.e. the intermediate spaces in gap form between the inner part and outer part of the housing.

BRIEF DESCRIPTION OF THE DRAWINGS

Embodiments of the invention are explained in greater detail with reference to the drawings and following description.

In the drawings.

DETAILED DESCRIPTION

Figure 1:
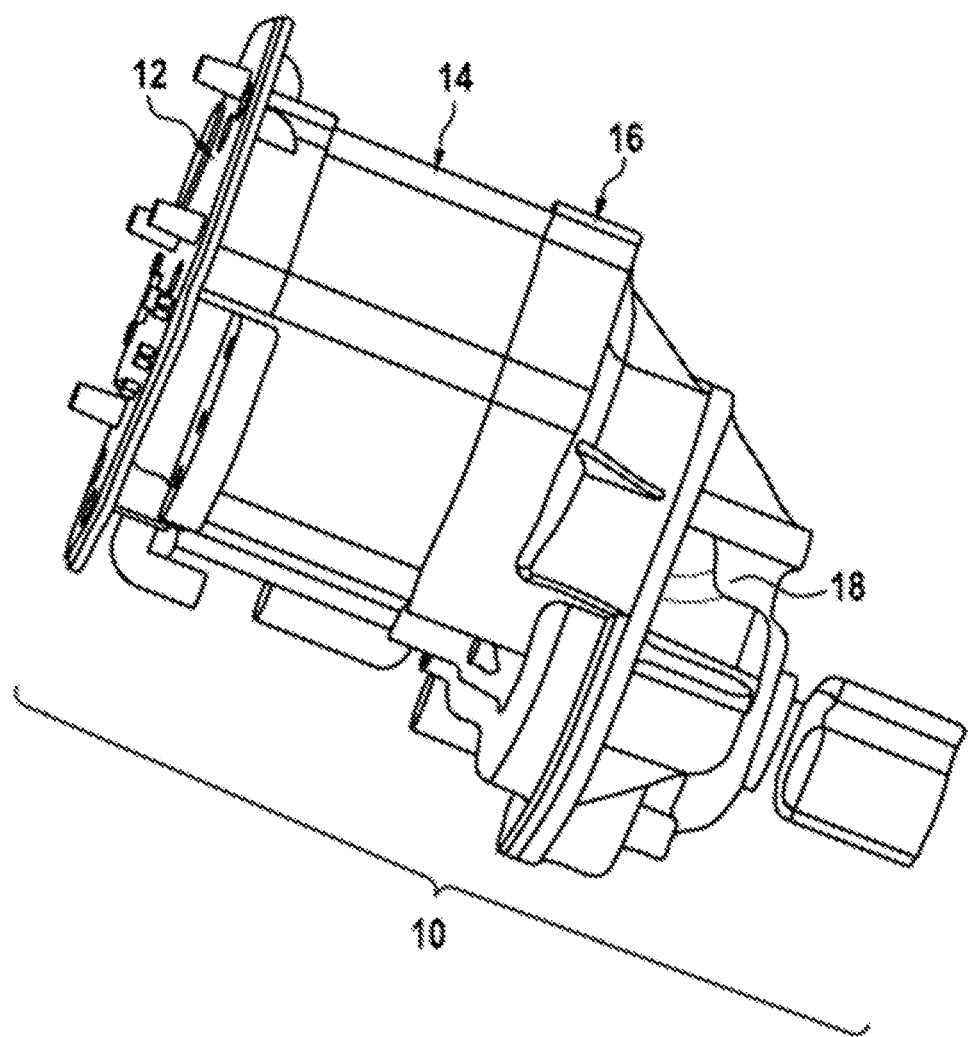
FIG. 1 shows a perspective view of an electric drive with laterally flange-mounted transmission.

FIG. 1 shows a perspective view of an electric drive 10, which has a first endshield 12 and a second endshield 16. A motor housing 14 with laterally flange-mounted transmission 18 is arranged between the first endshield 12 and the second endshield 16. An electric machine, not shown in greater detail, of the electric drive 10 is received in the motor housing 14.

Figure 2:
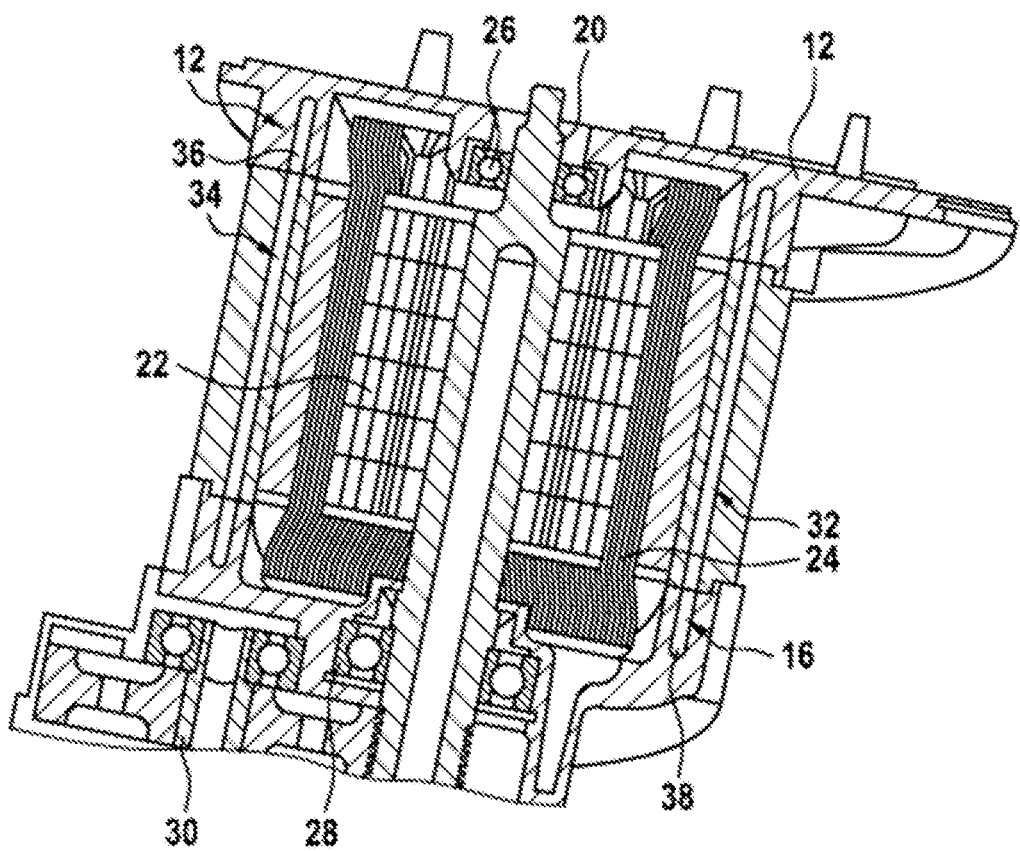
FIG. 2 shows a partial sectional illustration of the electric drive according to FIG. 1.

FIG. 2 shows that a rotor shaft 20, on which a rotor 22 of an electric machine is received, is mounted rotatably in a first bearing 26 and a second bearing 28. The rotor shaft 20 of the e-machine rotates relative to a stator 24, mounted fixedly on a housing, of an electric machine. The first bearing 26 is received in the first endshield 12. The second bearing 28 is mounted in the laterally flange-mounted transmission 18. The transmission 18 comprises an intermediate shaft 30, on which a gearwheel is received, which meshes with a drive pinion of the rotor shaft 20. Cooling channels 32 run in the motor housing 14. The individual cooling channels 32 are formed by separating webs 34 in the longitudinal direction. Each of the cooling channels 32 opens out into a first deflection pocket 36 or in a second deflection pocket 38, which are formed either in the first endshield 12 or in the material of the second endshield 16.

EMBODIMENTS OF THE INVENTION

In the following description of the embodiments of the invention, like or similar elements are denoted by like reference signs, wherein a repeated description of these elements is omitted in individual cases. The figures illustrate the subject matter of the invention merely schematically.

Figure 3:
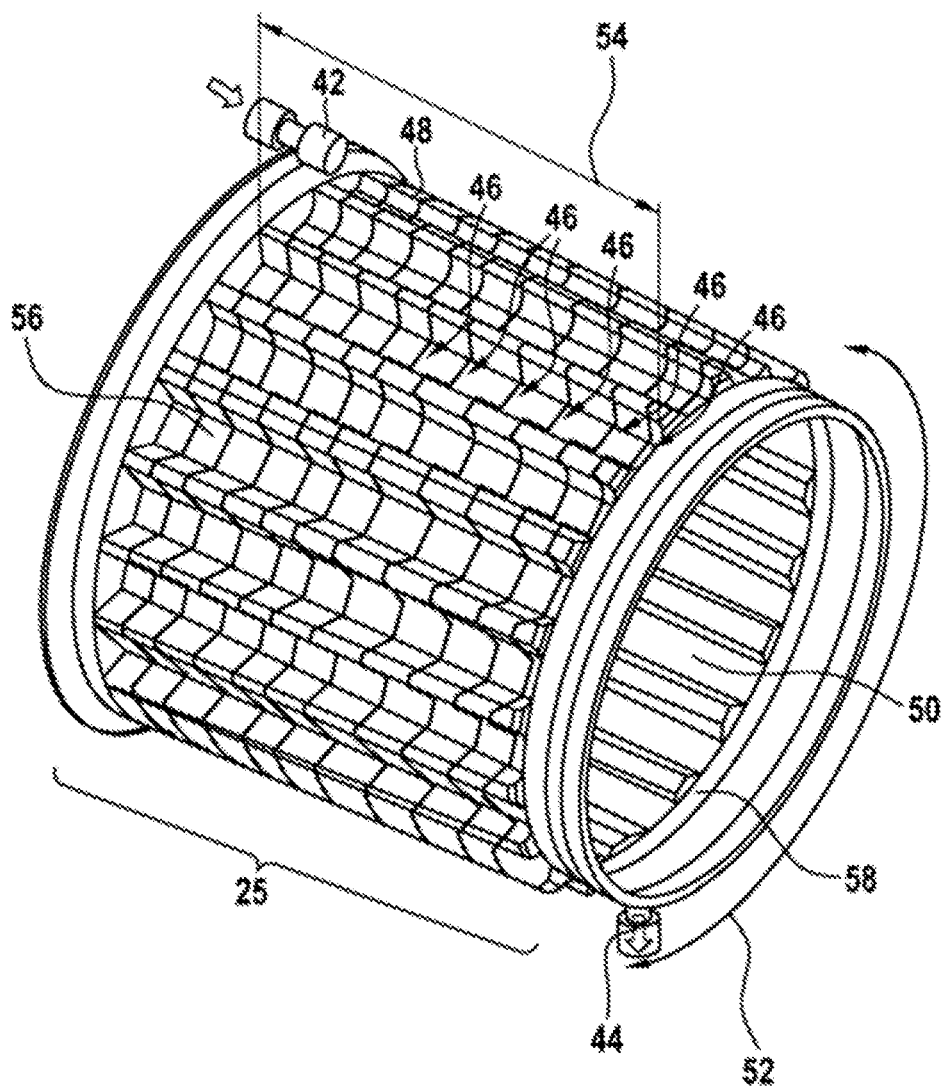
FIG. 3 shows a cooling medium flow at a housing proposed in accordance with the invention comprising an outer part and inner part.

FIG. 3 shows a schematic illustration of a flow 46 of the cooling medium through a housing 25. The cooling medium enters a cooling system of the housing 25 via an inflow 42 and leaves said cooling system at an outflow 44. As can be seen from the illustration according to FIG. 3, the housing 25 is formed by an outer part 48 and an inner part 50. In the joined state, the outer part 48 and the inner part 50 define a channel geometry, as will be described hereinafter in further detail. It can be seen from FIG. 3 that the inflow 42 and the outflow 44 can be oriented in an offset 52 in a circumferential direction of, for example, 180° relative to one another. Offset angles deviating from 180° are also possible. Furthermore, the illustration according to FIG. 3 shows that an axial distance 54 is present between the inflow 42 and the outflow 44 for the cooling medium. Whereas the inflow 42 for the cooling medium lies in a first axial plane 56, the outflow 44 for the cooling medium is located in a second axial plane 58 further distanced from this first axial plane 56 in the axial direction. Due to the spacing between the inflow and outflow 42/44 for the cooling medium, a particularly long flow path can be specified for the cooling medium, so that the latter can transport away a maximum amount of heat from the electric drive 10. Alternatively, it is also possible to arrange the inflow 42 and the outflow 44 in one and the same axial plane.

It can also be deduced from the illustration according to FIG. 3 that a flow 46 of the cooling medium passes substantially in a tangential direction and splits after the inflow 42. Since the inflow 42 and the outflow 44 for the cooling medium, seen in the axial direction 78, are arranged far apart from one another, a flow around practically the entire housing 25 of the electric drive 10 is achieved. In principle, the inflow 42 and the outflow 44 could also be arranged in one and the same axial plane.

Figure 4:
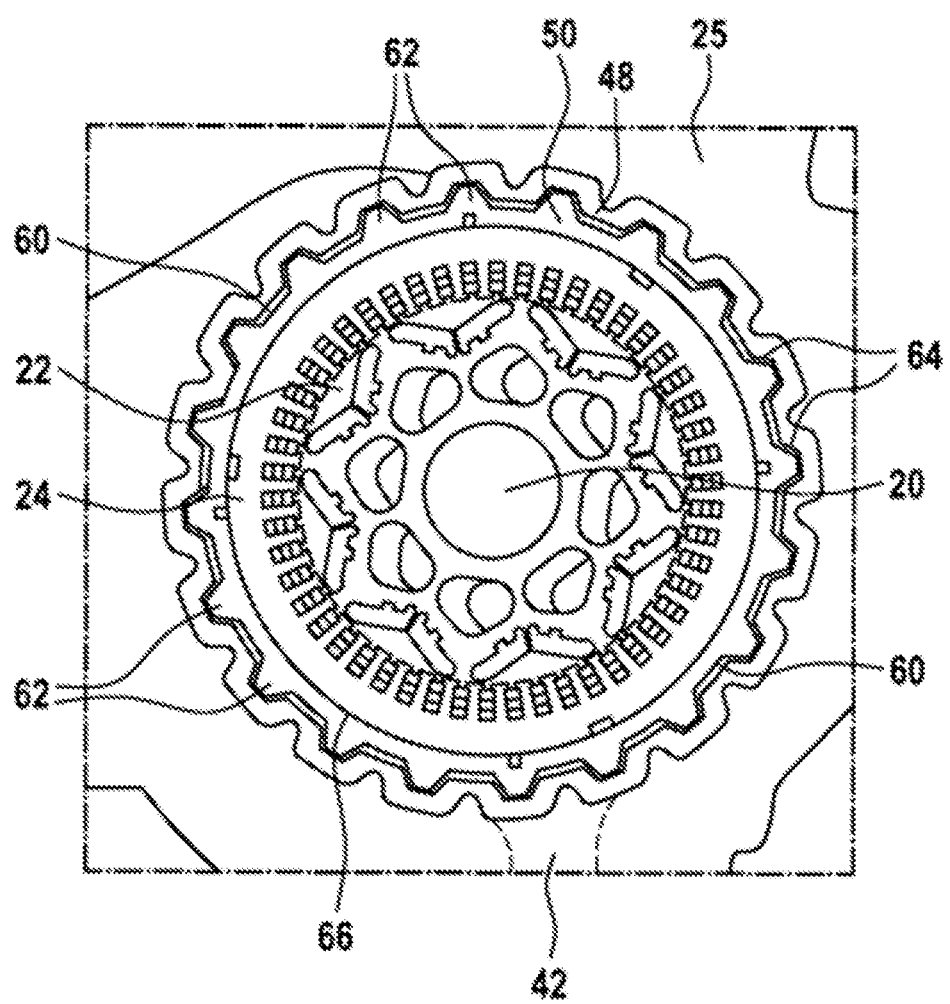
FIG. 4 shows a plan view of an inner part, inserted into an outer part of the housing, with shrunken stator.

FIG. 4 shows that the inner part 50 is inserted into the outer part 48 of the housing 25 of the electric drive 10. An intermediate space 60 in the form of an annular gap is created between the outer part 48 on the one hand and the inner part 50 on the other hand. The geometry of the intermediate space 60 in the form of an annular gap is substantially flat, so that a large contact surface area results between the cooling medium and the surface to be cooled and heat can be transported optimally to the cooling medium. As shown in FIG. 4, the individual segments of the intermediate space 60 in annular gap form are formed on the one hand by the axial ribbing 62 of the inner part 50 and on the other hand by the axial ribbing 64 of the outer part 48. FIG. 4 furthermore shows that the stator 24 of the electric machine is shrunk in the inner part 50 by a shrink connection 66 and is thus fixed without the need for further fastening elements.

FIG. 4 also shows that the stator 24 of the electric machine encloses the rotor 22 of the electric machine, which is received on the rotor shaft 20.

Figure 5:
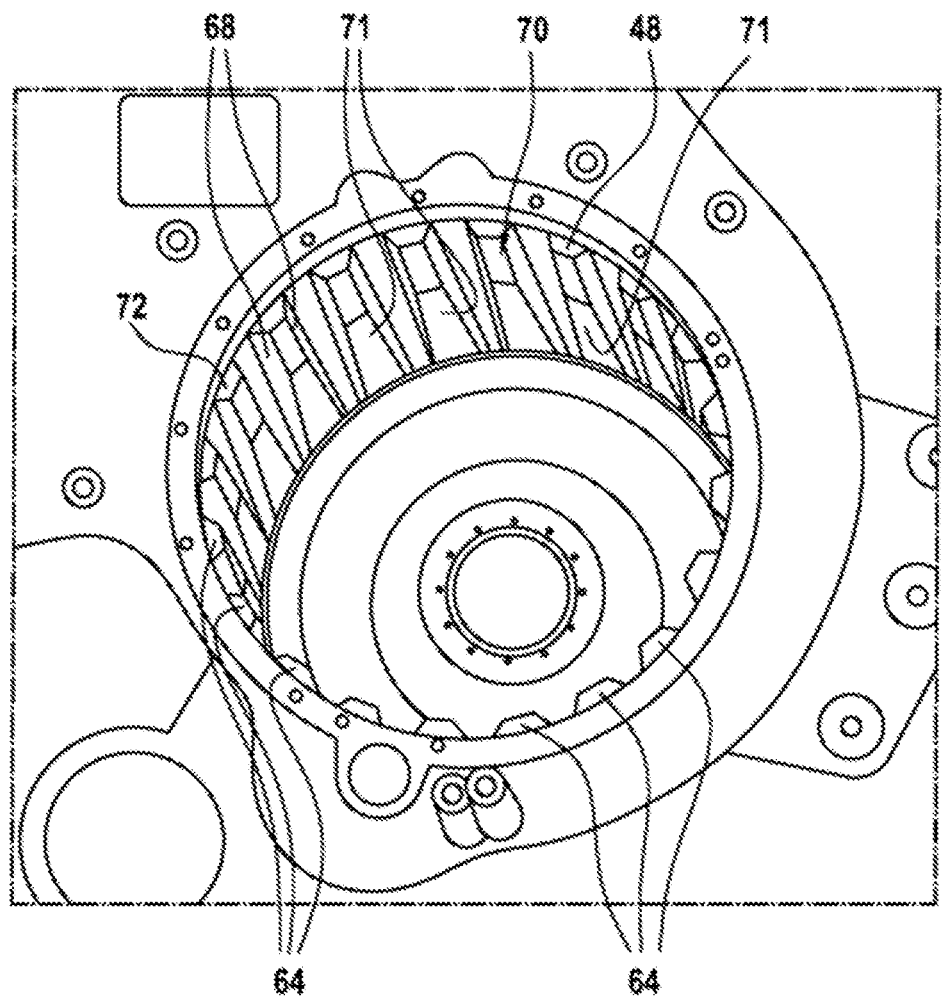
FIG. 5 shows a perspective view of the outer part of the housing.

FIG. 5 shows a perspective illustration of the outer part 48 of the housing 25. It is clear from the perspective illustration according to FIG. 5 that the outer part 48 of the housing 25 can be manufactured for example as a cast part, for example as an aluminum pressure die-cast part. For this purpose, the outer part 48 has demolding bevels 68. On account of the demolding bevels 68, the finished cast blank of the outer part 48 can be removed more easily from a casting mold or a casting tool. As also shown in FIG. 5, the outer part 48 comprises on its inner circumferential surface an axial ribbing 64 which consists of individual axial ribs spaced from one another in the circumferential direction and each comprising a base 72.

FIG. 5 also shows that the individual ribs of the axial ribbing 64 of the outer part 48 have a cylindrical overturn 71 within a machined region 74. Due to such a material-removing machining of the upper sides of the individual ribs of the axial ribbing 64 at the inner circumference of the outer part 48, the intermediate space 60 in the form of an annular gap in respect of the outer part 48 is defined.

Figure 6:
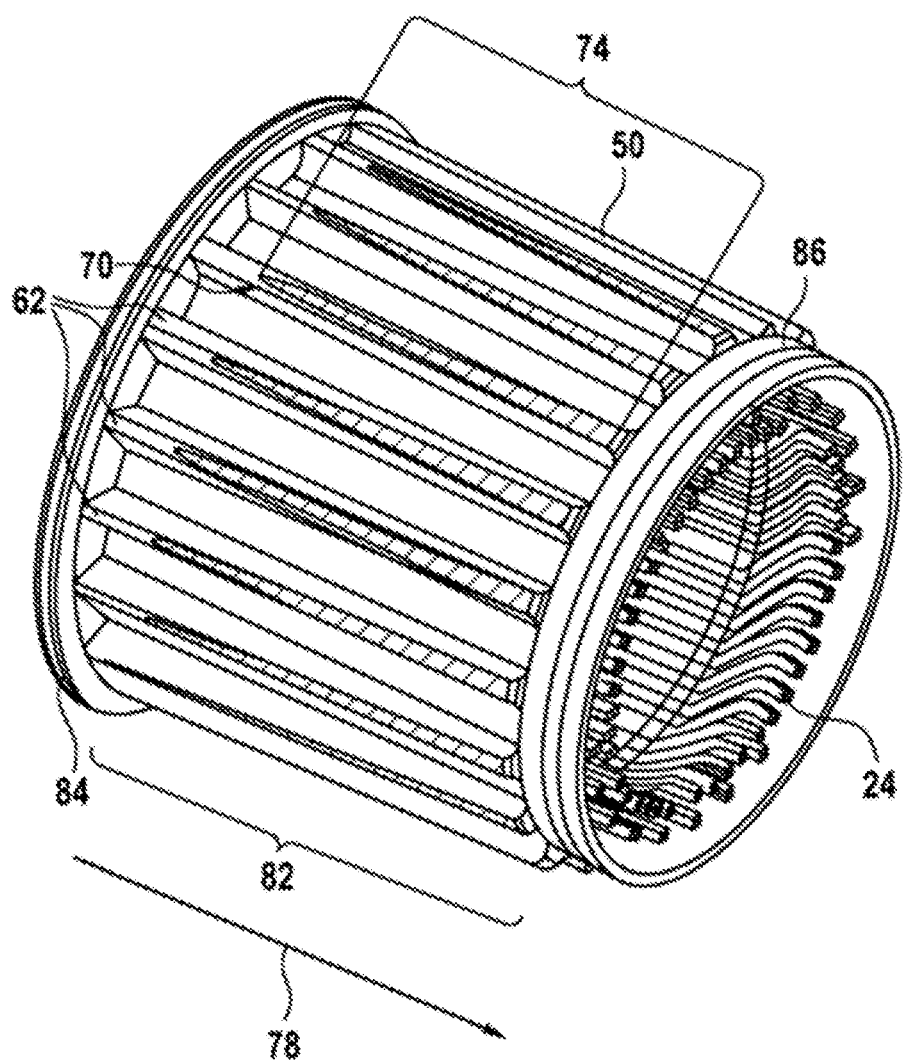
FIG. 6 shows a first variant of an inner part with outer axial ribbing.

Similarly to the illustration according to FIG. 5, the inner part 50 of the housing 25 shown in the illustration according to FIG. 6 has the axial ribbing 62 on its outer lateral surface. The individual ribs of the axial ribbing 62 on the outer circumference of the inner part 50 run substantially parallel to one another. As is also clear from the illustration according to FIG. 6, the inner part 50 of the housing 25, seen in the axial direction 78, is formed in a conicity 82. This means that the inner part 50 according to the illustration in FIG. 6, seen in the axial direction 78, is provided with a variable diameter, which extends in tapered fashion from a first diameter 84 to a second diameter 86. As also shown in FIG. 6, the stator 24 is fastened to an inner circumferential surface of the inner part 50 of the stator 24, for example via the shrink connection 66, shown in FIG. 4, between the stator 24 of the electric machine and the inner part 50 of the housing 25.

FIG. 6 also shows that the axial ribbing 62 of the inner part 50 of the housing 25 has a machined region 74. The machined region 74 of the axial ribbing 62 of the inner part 50 is provided with a conical overturn 70. Within the conical overturn 70, the upper edges of the individual ribs of the axial ribbing 62 are machined with material removal, i.e. are ground down.

When joining the inner part 50 to the outer part 48 of the housing 25 shown in FIG. 5, the intermediate space 60 in the form of an annular gap shown in FIG. 4 is created, within which the cooling medium flows tangentially (see position 46 in the illustration according to FIG. 3).

Figure 7:
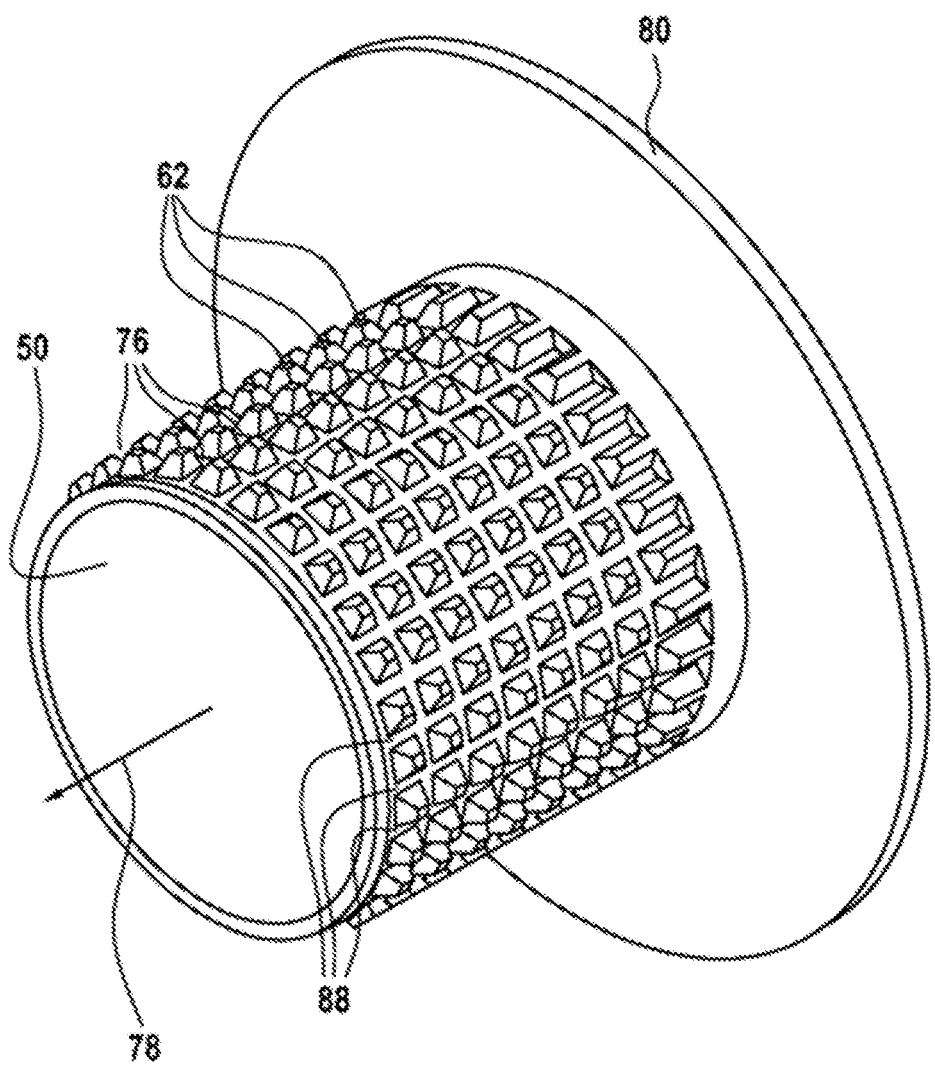
FIG. 7 shows a second variant of the inner part with interruptions of the axial ribbing.

FIG. 7 shows an alternative design option for the inner part 50 of the housing 25. According to the illustration in FIG. 7, the inner part 50 comprises an end face 80. At the outer circumference of the inner part 50, there runs the axial ribbing 62, which extends substantially in the axial direction 78. The individual ribs of the axial ribbing 62 of the inner part 50 have individual interruptions 76. The individual interruptions 76 of an individual rib of the axial ribbing 62 of the inner part 50 according to the illustration in FIG. 7 align with interruptions 76 of adjacent individual ribs of the axial ribbing 62. Grooves 88 are thus created, which extend in the circumferential direction of the inner part 50 and impress a turbulent flow state on the cooling medium as it passes through an arrangement formed of the outer part 48 and inner part 50. Due to the turbulent flow state of the cooling medium, which flows through the intermediate space 60 in the form of an annular gap in accordance with the flow 46 according to FIG. 3, an improved dissipation of heat from the housing 25 of the electric drive 10 proposed in accordance with the invention is provided.

Due to the variant of the inner part 50 according to FIG. 7, there is a significant enlargement of the surface and an impression of a turbulent flow state in relation to the cooling medium which flows through the intermediate space 60 in the form of an annular gap between the outer part 48 on the one hand and the inner part 50 of the housing 25 on the other hand.

The invention is not limited to the exemplary embodiments described here and the aspects highlighted therein. Rather, a multitude of modifications which lie within the capabilities of a person skilled in the art are possible within the scope stated by the claims.

What is claimed is:

1. An electric drive (10) of an electrically driven vehicle, the electric drive comprising a rotor (22) and a stator (24) that surrounds the rotor (22), the stator (24) is enclosed by a housing (25), wherein the housing (25) is formed by an outer part (48) and an inner part (50), the inner part (50) is inserted into the outer part (48),
    wherein the stator (24) is coupled to an inner peripheral surface of the inner part (50),
    wherein the outer part (48) includes axial ribbing (64) having individual axial ribs that are spaced apart from one another in a circumferential direction and extend in an axial direction (78) of the housing (25) and are arranged on an inner circumferential surface of the outer part (48),
    wherein the inner part (50) includes axial ribbing (62) having individual axial ribs that are spaced apart from one another in the circumferential direction and extend in the axial direction (78) of the housing (25) and are arranged on an outer circumferential surface of the inner part (50),
    wherein an intermediate space (60) is formed where individual ribs of the axial ribbing (64) of the outer part (48) are arranged in the circumferential direction between individual ribs of the axial ribbing (62) of the inner part (50), the intermediate space (60) is configured to accommodate a cooling medium flow and is annular in shape,
    wherein the intermediate space (60) is in fluid communication with an inflow (42) of the outer part (48) and an outflow (44) of the outer part (48), the inflow (42) and the outflow (44) being offset by 180 degrees in the circumferential direction relative to one another.

2. The electric drive (10) as claimed in claim 1, wherein the inflow (42) and the outflow (44) are positioned at an axial distance (54) in relation to one another.

3. The electric drive (10) as claimed in claim 1, wherein the axial ribbing (62, 64) of the outer part (48) and the inner part (50) are provided on demolding bevels (68) of the outer part (48) and inner part (50) of the housing.

4. The electric drive (10) as claimed in claim 1, wherein the outer part (48) and the inner part (50) of the housing (25) both include a conical-shaped region (82).

5. The electric drive (10) as claimed in claim 4, wherein the conical-shaped region (82) is determined by a first diameter (84) and a second diameter (86) of the inner part (50) of the housing (25).

6. The electric drive (10) as claimed in claim 1, wherein the axial ribbing (64) on the inner circumferential surface of the outer part (48) has a machined region (74).

7. The electric drive (10) as claimed in claim 1, wherein the axial ribbing (62) on the outer circumferential surface of the inner part (50) has a machined region (74).

8. The electric drive (10) as claimed in claim 1, wherein the stator (24) is fixed by a shrink connection (66) in the inner part (50) of the housing (25).

9. The electric drive (10) as claimed in claim 1, wherein the axial ribbing (62) of the inner part (50) of the housing (25) has interruptions (76), which impress a turbulent state on a flow (46) of a cooling medium.

10. An e-axle module of the electrically driven vehicle, the e-axle module comprising the electric drive (10) as claimed in claim 1.

11. The electric drive (10) as claimed in claim 1, wherein the axial ribbing (64) on the inner circumferential surface of the outer part (48) has a machined region (74) which is manufactured as a cylindrical overturn (71).

12. The electric drive (10) as claimed in claim 1, wherein the axial ribbing (62) on the outer circumferential surface of the inner part (50) has a machined region (74) which is provided as a conical overturn (70).

* * * * *